April 1, 1924.
A. FUHRMANN
SPRING WHEEL
Filed Feb. 26, 1921   2 Sheets-Sheet 2
1,488,783
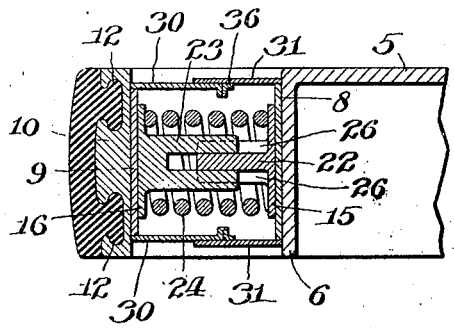
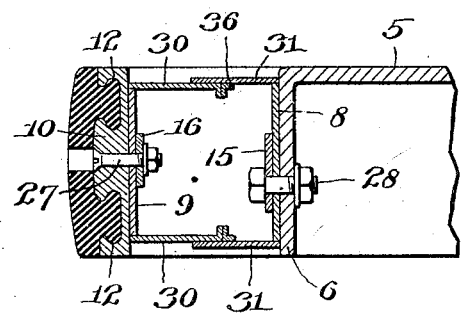
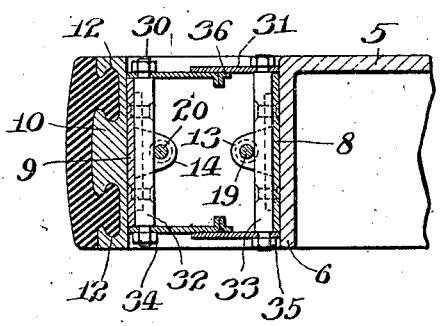
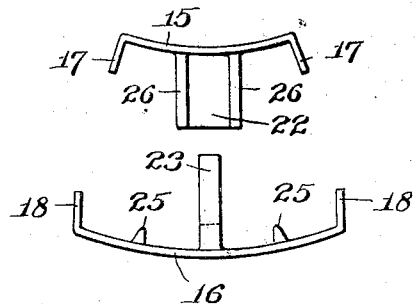
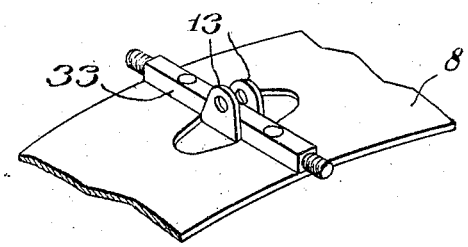
Inventor.
Albert Fuhrmann
By
Attorney Patented Apr. 1, 1924.

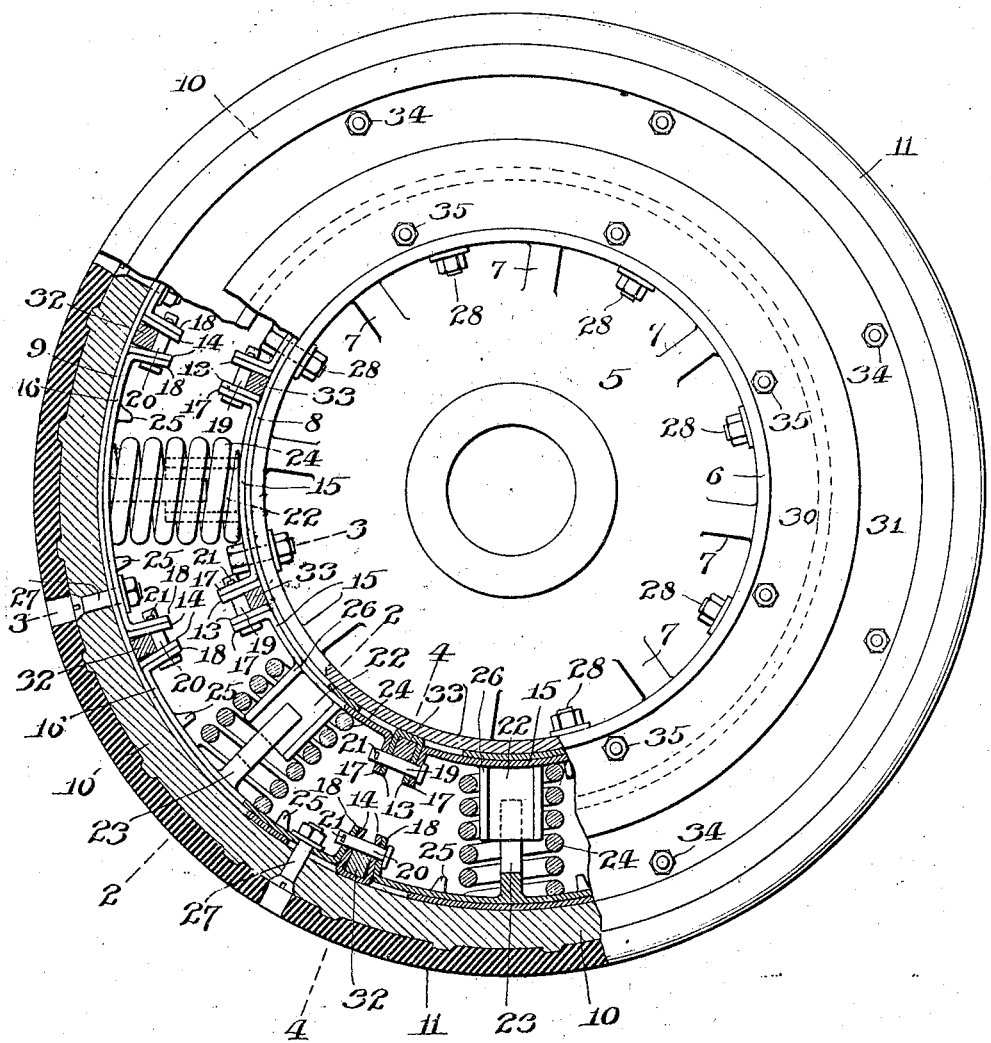

1,488,783

UNITED STATES PATENT OFFICE.

ALBERT FUHRMANN, OF PHILADELPHIA, PENNSYLVANIA.

SPRING WHEEL.

Application filed February 26, 1921. Serial No. 447,910.

*To all whom it may concern:*

Be it known that I, ALBERT FUHRMANN, a citizen of the United States, residing at Philadelphia, in the county of Philadelphia and State of Pennsylvania, have invented certain new and useful Improvements in Spring Wheels, of which the following is a specification.

The object of my invention is to provide a spring wheel of novel, simple and efficient construction and having provision whereby the various parts thereof may be readily assembled and disassembled, and whereby any one of the resilient or spring members thereof may be removed and replaced without disturbing the others.

With the above and related objects in view the invention consists in the novel construction, combination and arrangement of parts hereinafter described and claimed.

In the accompanying drawings, illustrating the invention,

Figure 1 is a view, partly in side elevation and partly in section of a spring wheel embodying my invention.

Figures 2, 3 and 4 are sectional details thereof, on lines 2—2, 3—3 and 4—4 thereof, respectively.

Figure 5 is a side view of one pair of the guiding devices slightly separated from each other.

Figure 6 is a perspective view of a part of one of the rims and one of the cross bars riveted thereto.

Referring to the drawings, 5 designates a disc wheel body formed of suitable metal and provided with an annular flange 6 extending from its outer edge. The flange 6 is braced at suitable intervals around the wheel by brackets 7 which extend between the flange 6 and the main body of the wheel.

Surrounding the flange 6 are inner and outer rims 8 and 9, respectively. The inner rim 8 is seated on the flange 6, and the outer rim 9 is held spaced from the inner rim 8 by interposed yielding devices or sections, which will be hereinafter described.

Seated on the outer rim 9 and surrounding the same is a metal tire ring 10, and surrounding the tire ring 10 is a rubber tread 11 which is secured to the ring 10 by being vulcanized thereto. As an additional means to hold the tread 10 in place upon the ring 11, I provide the latter with a pair of annular, undercut grooves 12 and provide the tread 11 with integral parts which extend into and fill the grooves 12, as clearly shown in Figs. 2 and 3.

The inner rim 8 is provided with spaced pairs of lugs 13 which are cut from the body of the rim and bent to extend therefrom toward the rim 9. These lugs 13 are shown in detail in Fig. 6. The outer rim 9 is provided with similar lugs 14 which correspond in number with the lugs 13 and which are cut from the body of the rim 9 and are bent to extend therefrom toward the rim 8 and which are arranged opposite to the lugs 13, as clearly shown in Fig. 1.

The yielding devices or sections, hereinbefore referred to, are arranged between adjacent pairs of lugs 13 and adjacent pairs of lugs 14 of the inner and outer rims 8 and 9, respectively, and they are evenly spaced or distributed around the space between the rims 8 and 9. As the yielding devices or sections are alike in construction, a description of one will suffice for all. Each yielding device or section is constructed as follows:

Conforming to the curvature of and seated against the opposing surfaces of the inner and outer rims 8 and 9, are inner and outer plates 15 and 16, respectively. The inner plate 15 extends the full distance between the two lugs 13 between which it is located, and its ends are provided with outwardly extending flanges 17 in close relationship with the adjacent lugs 13. The outer plate 16 extends the full distance between the two lugs 14 between which it is located and its ends are provided with outwardly extending flanges 18 in close relationship with the adjacent lugs 14. The inner and outer plates 15 and 16 are detachably secured to the inner and outer rims 8 and 9 by removable pins 19 and 20 which penetrate the lugs 13 and flanges 17, and the lugs 14 and flanges 18, respectively. The pins 19 and 20 each have a head on one end thereof and a cotter pin 21 in an opening in the other end thereof to hold them in place, as shown in the drawings. By removing the cotter pins 21 the pins 19 and 20 are freed to be withdrawn from the structure, to permit the removal of the plates 15 and 16 from the rims 8 and 9. The inner plate 15 is provided with a guiding part or wall 22 which extends toward the outer plate 16 and the outer plate 16 is provided with a guiding part 23 which extends toward the inner plate 15 and which is bifurcated and embraces and is slidably fitted to the opposite side surfaces of the guiding part or wall 22. The opposite side surfaces of the part or wall 22 are parallel to a plane at right angles to the axis of rotation of the wheel so that the guiding parts 22 and 23 will co-operate to prevent relative lateral displacement of the rims 8 and 9, and permit free relative movement thereof between the rims 8 and 9 in directions parallel to said plane. Encircling the guiding parts 22 and 23 is a spring 24 which extends between and engages the plates 15 and 16. The outer plate 16 is provided with projections 25 on the respective sides of the spring 24 to engage the same and limit the displacement of the outer end thereof when the rims 8 and 9 are moved relatively to each other. The ends of the wall or part 22 are provided with radially extending flanges 26 on the respective sides thereof which are adapted to be engaged by the bifurcated part 23 to limit the relative movement between the rims 8 and 9.

The outer rim 9 and tire ring 10 are secured together by suitable bolts 27 which penetrate the same and the outer plates 16; and the inner rim 8 and flange 6 of the wheel body 5 are secured together by suitable bolts 28 which penetrate the same and the inner plates 15.

It will now be understood that the outer rim 9 and tire ring 10 form a rigid, annular, outer structure, and that the inner rim 8 and wheel body 5 form a rigid inner structure, that the inner structure is bodily movable relatively to the outer structure, but only parallel to a plane at right angles to the axis of rotation of the wheel, and that the outer structure yieldingly supports the inner structure by the interposed springs 24, all of which are under compression in the normal condition of the wheel.

By removing the bolts 28, the rim 8 and the entire structure surrounding it may be removed intact from the wheel body 5, and another similar structure substituted therefor, in cases of accident or the breakage of any of the parts or for any other purpose.

Should any one of the yielding sections between the rims 8 and 9 be broken or injured its plates 15 and 16 and spring 24 may be readily removed from the remainder of the structure for the substitution of another by removing the pins 19 and 20, and the bolts 27 and 28 which hold its plates 15 and 16, respectively, in place.

To guard the devices between the rims 8 and 9 and prevent the accumulation of dirt therein, I provide each side of the wheel with outer and inner plates 30 and 31, respectively, and secure the outer plates 30 to round ends on bars 32 which extend between the lugs of the pairs 14 and are riveted to the outer rim 9, and secure the inner plates 31 to round ends on bars 33 which extend between the lugs of the pairs 13 and are riveted to the inner rim 8. The round ends of the bars 32 and 33 extend through openings in the plates 30 and 31 and the plates are secured to the bars by nuts 34 and 35 screwed on to the projecting round ends of the bars 32 and 33 which are threaded for the reception of the nuts. The plates 30 and 31 lap each other and close the sides of the space between the rims 8 and 9 and permit relative movement between the inner and outer rims or the inner and outer rigid structures of the wheel. The inner edges of the outer plates 30 are provided with suitable rubber rings or flanges 36 which bear against the inner surfaces of the inner plates 31 and provide a dust proof joint between the plates.

I claim as my invention:—

1. In a spring wheel and in combination, an inner rim, an outer rim surrounding the inner rim in spaced relation thereto, outer plates secured to the outer rim, inner plates secured to the inner rim, guiding parts projecting outwardly from the inner plates and having radial flanges on the ends thereof; bifurcated guiding parts projecting inwardly from the outer plates and embracing the first named guiding parts and slidingly engaged therewith between the end flanges thereon and springs interposed between the outer and inner plates and encircling said parts and yieldingly maintaining the outer rim spaced from the inner rim.

2. In a spring wheel and in combination, an inner rim, an outer rim surrounding the inner rim in spaced relation thereto, outer and inner plates interposed between said rims, means to detachably secure the outer plates to the outer rim, means to detachably secure the inner plates to the inner rim, springs interposed between the outer and inner plates and yieldingly maintaining the outer rim spaced from the inner rim, said outer plates having projections on the respective sides of the springs to engage them and limit the displacement of the outer ends thereof when the rims are moved relatively to each other and means to guide said rims during the movement thereof relatively to one another.

3. In a spring wheel and in combination, an inner rim, an outer rim surrounding the inner rim in spaced relation thereto, outer and inner plates interposed between said rims, lugs extending inwardly from the outer rim between adjacent outer plates, means to detachably secure said lugs and said outer plates together, lugs extending outwardly from the inner rim between adjacent inner plates, means to detachably secure the last named lugs and said inner plates together, springs interposed between the outer and inner plates and yieldingly maintaining the outer rim spaced from the inner rim, and means to guide said rims during the movement thereof relatively to one another.

4. In a spring wheel and in combination, an inner rim, an outer rim surrounding the inner rim in spaced relation thereto, outer and inner plates interposed between said rims, inwardly extending flanges on the ends of the outer plates, outwardly extending flanges on the ends of the inner plates, lugs extending inwardly from the outer rim between adjacent flanges on the outer plates, pins penetrating said lugs and flanges and detachably securing them together, lugs extending outwardly from the inner rim between adjacent flanges on the inner plates, pins penetrating the last named lugs and the flanges on the inner plates and detachably securing them together, springs interposed between the outer and inner plates and yieldingly maintainng the outer rim spaced from the inner rim, and means to guide said rims during the movement thereof relatively to one another.

5. In a spring wheel and in combination, an inner rim, an outer rim surrounding the inner rim in spaced relation thereto, yielding sections interposed between said rims, each section including an outer plate having inwardly turned end flanges, an inner plate having outwardly turned end flanges, and an interposed spring, lugs extending from the outer and inner rims between the flanges of the outer and inner plates respectively, and means for detachably securing the said flanges and the interposed lugs together.

In testimony whereof I affix my signature hereto.

ALBERT FUHRMANN.